（12）United States Patent
Haruna et al.

(10) Patent No.: US 7,640,330 B2
(45) Date of Patent: Dec. 29, 2009

(54) COMPUTER SYSTEM WITH A TERMINAL THAT PERMITS OFFLINE WORK

(75) Inventors: Takaaki Haruna, Tokyo (JP); Akihiro Urano, Tokyo (JP); Yumiko Sugita, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 453 days.

(21) Appl. No.: 11/244,236

(22) Filed: Oct. 6, 2005

(65) Prior Publication Data

US 2006/0074949 A1  Apr. 6, 2006

(30) Foreign Application Priority Data

Oct. 6, 2004  (JP) .............................. 2004-293917

(51) Int. Cl.
*G06F 15/173* (2006.01)
(52) U.S. Cl. .................. 709/223; 709/203; 709/224
(58) Field of Classification Search ................ 709/203, 709/217, 219, 223, 224
See application file for complete search history.

(56) References Cited

U.S. PATENT DOCUMENTS 6,735,601 B1 * 5/2004 Subrahmanyam ........... 707/200
7,240,239 B2 * 7/2007 Suzaki ......................... 714/15
7,356,679 B1 * 4/2008 Le et al. ....................... 713/1

FOREIGN PATENT DOCUMENTS

| JP | 403255564 A | * 11/1991 |
| JP | 11-249900 | 9/1999 |
| JP | 2002-009762 | 1/2002 |
| JP | 2002-207944 | 7/2002 |

OTHER PUBLICATIONS

Microsoft "Technical Overview of Terminal Services".
"Realization of Virtual Computing Evvironment Using Citrix Application Infrastructure Software" Dan Kusnetzky.
Megumi Hisayuki, et al., Experimentation of trnaporting running image of OS in Network Transferable Computer, Technical Report of IEICE, Jun. 2001, p. 33, IEICE CPSY2001-18.

* cited by examiner

*Primary Examiner*—Lashonda T Jacobs
(74) *Attorney, Agent, or Firm*—Antonelli, Terry, Stout & Kraus, LLP.

(57) ABSTRACT

In a server-based computing environment, an environment that is the same as the environment realized on a server is provided to a user at a place where connection to a network can not be established. A virtual computer is constructed on the server. A client can executes an application program on the virtual computer. When the client is disconnected from the network, data required for constructing the virtual computer are saved in a file and that file is sent as it is to the client. On the client, the received file is used to construct the virtual computer, and work is continued on the virtual computer.

18 Claims, 10 Drawing Sheets

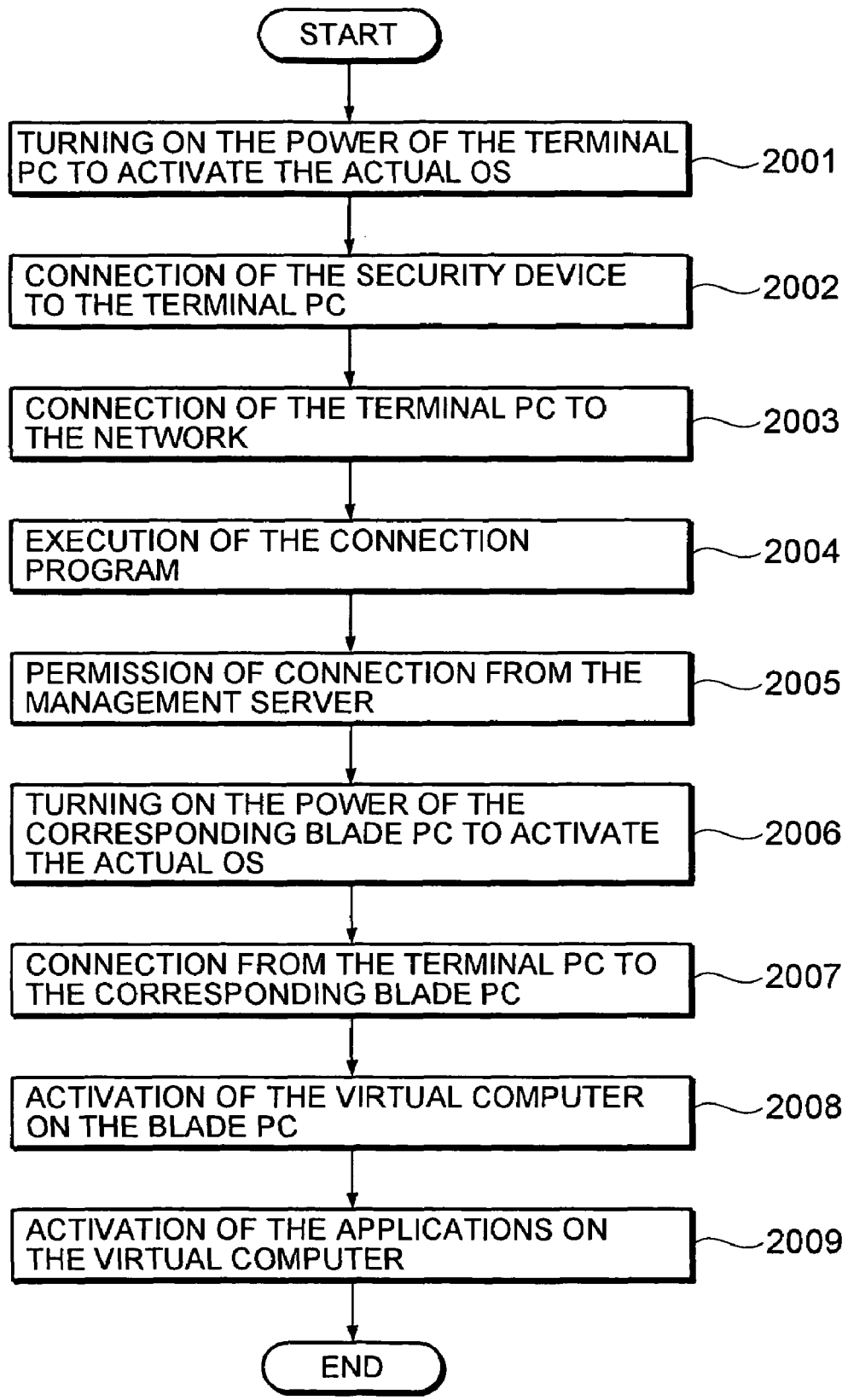

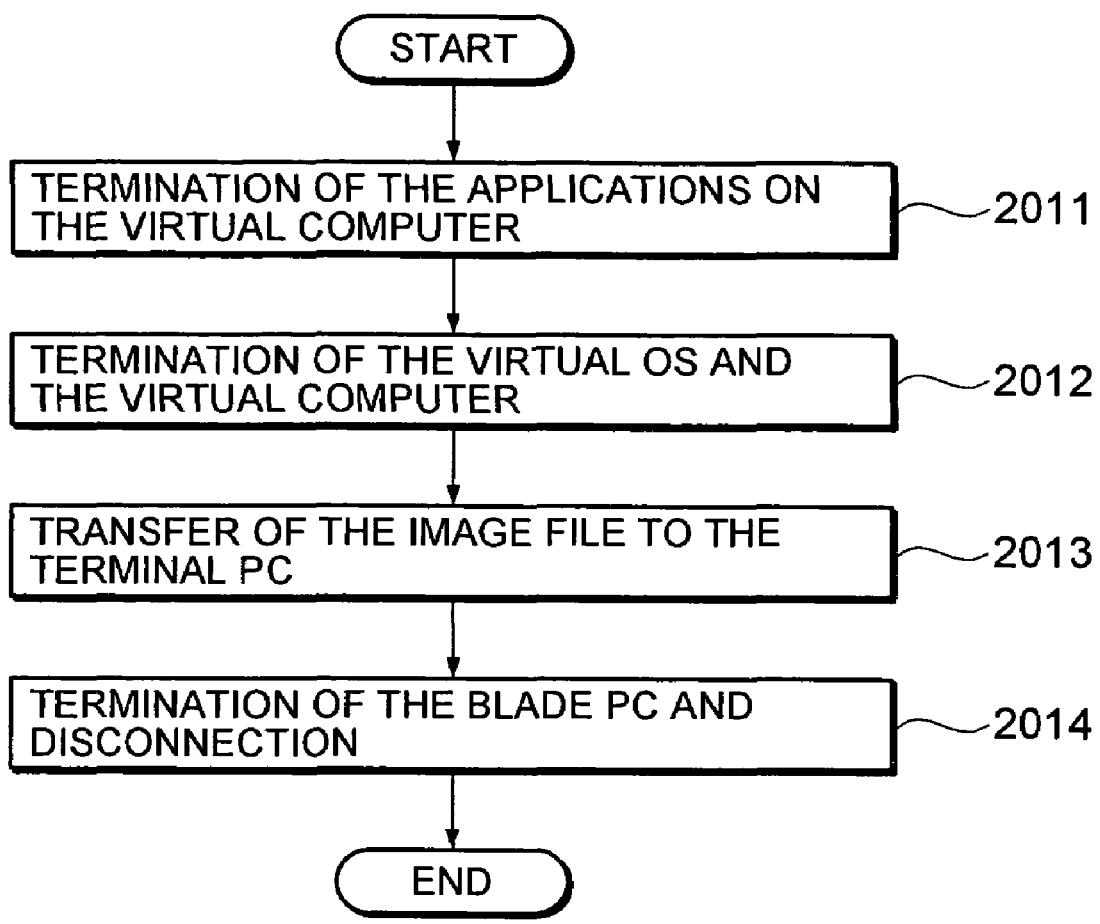

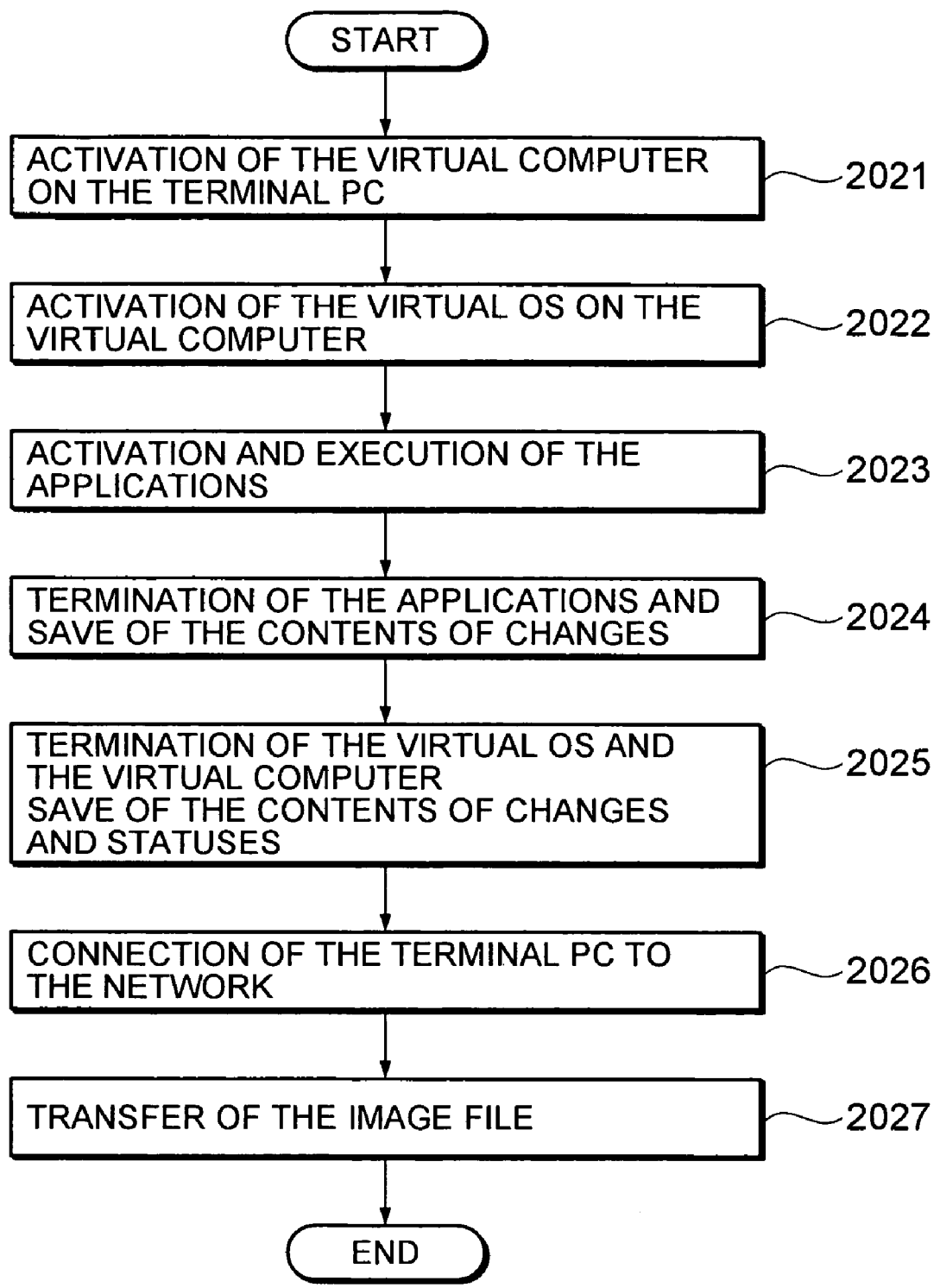

COMPUTER SYSTEM WITH A TERMINAL THAT PERMITS OFFLINE WORK

BACKGROUND OF THE INVENTION

The present invention relates to a server-based computing technique, and particularly to a server-based computing technique in a computer system having a client that permits offline work too.

Recently, there has been a trend toward lower prices of personal computers (PCs) and network devices, and more companies supply terminals such as PCs to most of their employees to make them do their work on their terminals. In proportion to the increase of PCs used in a company, an equipment administrator of the company should carry out the maintenance of more PCs. As such maintenance, may be mentioned, for example, upgrading and bug fixing of an operating system (OS) and business application programs, dealing with hardware failures, taking anti-virus countermeasures, and removing viruses.

The cost of such maintenance work is very large and increases in proportion to the number of PCs to be managed. Thus, even if it is possible to introduce PCs at a cheaper price, maintenance work after the introduction entails great cost.

As a method of decreasing the maintenance cost, there are server-based computing techniques such as Windows Terminal Service and citrix metaframe (See, for example, Microsoft, "Technical Overview of Terminal Services", [online], July 2002, <URL: http://download.microsoft.com/download/2/8/1/281f4d9 4-ee89-4b21-9f9e-9accef44a743/TerminalServiceOverview. doc> (hereinafter, referred to as Non-Patent Document 1), Dan Kusnetzky, "Realization of Virtual Computing Environment Using Citrix Application Infrastructure Software", [online], IDG Japan, Date of last retrieval 2004/02/13, < URL: http://www.citrix.co.jp/site/resources/pdf/products/IDCpaper_3511_finalQCJ.p df> (hereinafter, referred to as Non-Patent Document 2)).

The server-based computing takes the form of a client-server computing system. And, in a server-based computing system, an application program requested by a client is executed on the side of a server.

A system according to the server-based computing is provided with a computer (a server) that executes processing (application programs) that users need for their work and terminals (clients) for instructing execution of application programs to the server and for confirming the results. Through a client at hand, a user gives an instruction to the server, to which the client is connected through a network, in order to execute an application program on the server. Then, a result of the execution on the server is displayed on the screen of the client. Thus, only if a user equips a PC or portable terminal at hand with a server connecting function, then, at a location where network connection to the server can be established, the user can use the application programs in the same environment as his office and do his work.

Further, in a system according to the server-based computing, all processing functions (application programs) and all information (data) relating directly to the work are placed on the side of the server and managed by the server in a centralized way. Accordingly, on the side of a client, it is possible to restrict application programs installed on the client to the necessity minimum. Further, the application programs can be easily updated.

SUMMARY OF THE INVENTION

However, when the above-described server-based computing technique is employed, a client can use the application programs on the server only if the client is located at a place where network connection is available. Namely, there is a problem that, when a user goes, for example on business, to a place where network connection can not be established, the user can not access the server to carry out processing needed for his work.

As a matter of fact, such places exist widely. And, user's demand is that he should do his work without wasting his time even in such a place or even when network connection can not be established temporarily.

In such a case, a user can use only a client at hand. However, the client itself neither has a function of processing his work nor stores information relating to his work. At the time of doing work on the offline client, it is necessary to introduce equivalent application programs to the client in order to establish the same environment as the environment of the online work executed on the server. Further, the user is compelled to be conscious of differences between these environments. For example, when an application program is introduced to an individual client, there may be a version difference from the application program on the server. In that case, it is necessary for the user to conduct complicated operations such as synchronization of the required document files and configuration setting. Such complicated ness further increases when the server and the client use different OSs respectively.

Further, when application programs are introduced to a client to establish an environment that permits offline work, it means that there always exists a client that holds work contents. This entails the risk of leakages of the work contents and personal information owing to the loss or stealing of the client.

Considering the above situation, an object of the present invention is to provide an environment that is established on a server, for a user of a terminal in a server-based computing environment, even at a place where network connection is not available.

To solve the above problems, the present invention introduces a concept of a virtual computer in a system that comprises clients each permitting offline work and a server, for realizing server-based computing. A computer environment realized by the virtual computer is transferred as it is between the server and a client.

In detail, the present invention provides a computer system comprising one or more terminals each permitting offline work and a computer to which the terminals are connected through a network, for executing application programs (hereinafter, referred to as APs) requested by the terminals on the computer, wherein: the computer comprises, for each terminal connected to the computer: a storage area for storing executable files of the APs, data as objects of editing by the APs, an executable OS file for realizing an OS of a virtual computer, and setting information required for working on the virtual computer; a virtual computer control means, which realizes the virtual computer, using the executable OS file; and a control means, which executes an AP requested by the terminal out of the APs using the setting information on the virtual computer, and, on receiving an instruction to terminate the AP from the terminal, stores the setting information, the executable OS file, the data and the executable files of the APs at a time of receiving the instruction into the storage area as an image file, and transfers the image file to the terminal before the terminal breaks the connection; and each of the terminals comprises: a storage unit that stores the image file received from the computer; a terminal virtual computer control means, which realizes the virtual computer, using the executable OS file; and a terminal control means, which uses the setting information to execute the APs on the virtual computer when the terminal is not connected to the computer.

As described above, in a server-based computing environment, the present invention can safely provide the environment realized on the server to a user even at a place where connection to the network can not be established.

BRIEF DESCRIPTION OF THE DRAWINGS

FIG. 8 is a flowchart showing a flow from connection of a terminal PC to a network down to a start of processing according to the embodiment;

FIG. 9 is a flowchart showing a flow down to disconnection of the terminal PC from the network according to the embodiment; and FIG. 10 is a flowchart showing a flow down to connection of a terminal PC to the network again, after stand-alone use of the terminal PC according to the embodiment.

DETAILED DESCRIPTION

Figure 1:
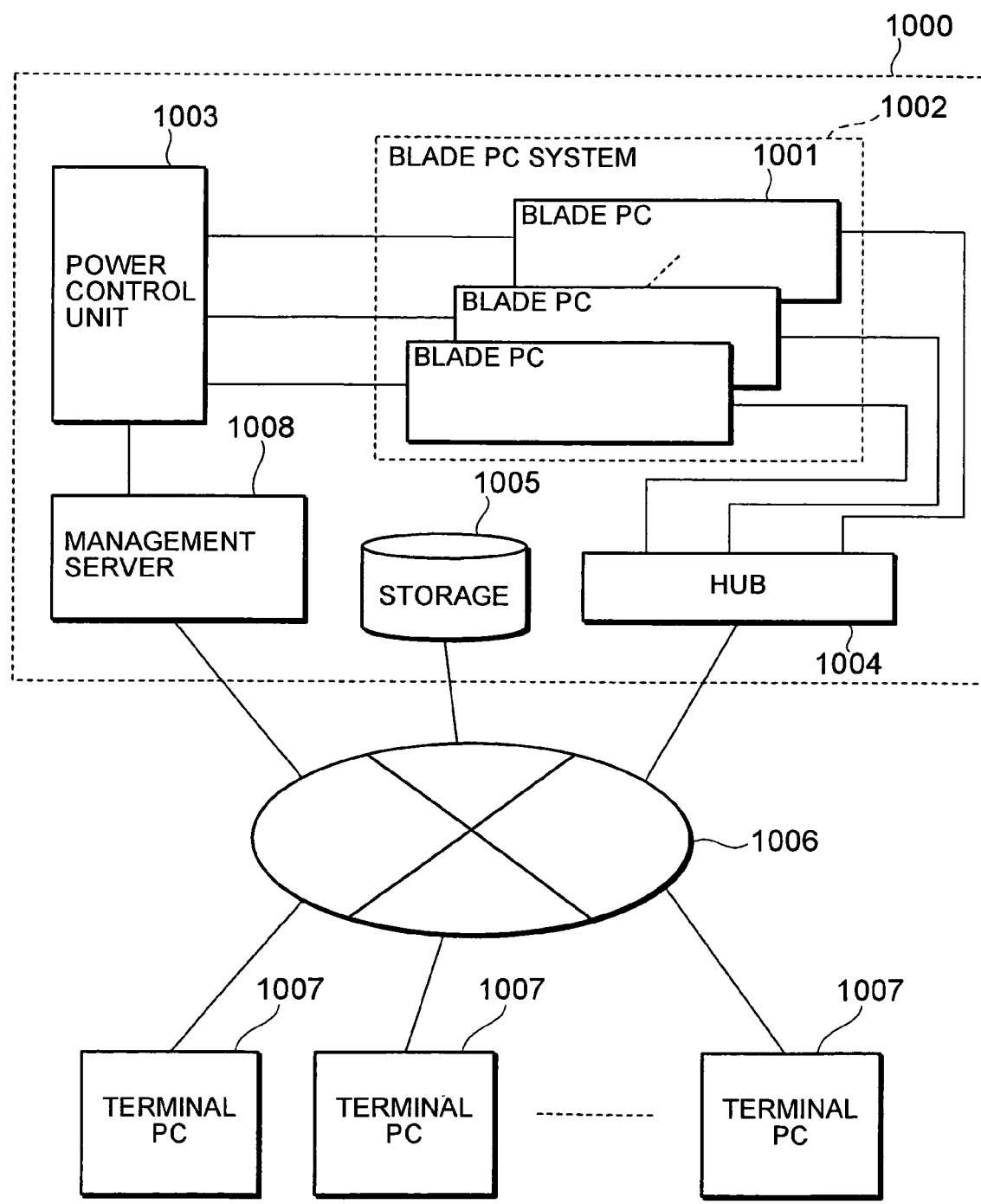
FIG. 1 is a diagram showing a configuration of a computer system according to an embodiment of the present invention.

Before describing an embodiment according to the present invention referring to the drawings, an outline of the embodiment will be described.

In the present embodiment, a server, which is implemented by an information processing apparatus such as a remote PC, allocates, to each user who accesses the server, a storage area in a storage provided to the server. And, in a storage area allocated to a user, the server holds personal environment information set for that user. Here, the personal environment information means all information required for constructing a virtual computer on an OS of a computer such as the server and for realizing application programs and the like on the virtual computer.

When a user accesses the server through a client in order to do work through a network, the server provides a virtual computer for the client. Here, the virtual computer is constructed by the personal environment information of that user. The user works on the provided virtual computer, through the client. In the course of working, the user can freely change the setting of the virtual computer and the like. All contents of changes are reflected on the personal environment information.

When the user disconnects the client from the server, his personal environment information at that point is duplicated as it is on the client. At the time of using the client offline, the user works on a virtual computer constructed by the duplicated personal environment information. Here also, the user can freely change the setting of the virtual computer and the like. All contents of changes are reflected on the personal environment information on the client.

When the user connects the client to the server again, the latest personal environment information held on the client is sent to the server. The server replaces the existing personal environment information with the latest personal environment information received, and then provides the virtual computer environment to the client.

According to the present embodiment, personal environment information on a client is synchronized with the personal environment information on the server, and the user can do his work on the same environment both when the work is executed on the server through the client and when the work is executed on the offline client.

As described above, the present embodiment introduces the concept of the virtual computer. A virtual computer is realized on a computer when an OS (hereinafter, referred to as the virtual OS) other than the OS (hereinafter, referred to as the actual OS) of the computer in question operates on that computer. In the present embodiment, through a client, a user executes application programs not on the actual OS of the remote PC but on the virtual OS of the virtual computer. The virtual computer is realized by a virtual computer program using the personal environment information.

The actual OS of the remote PC that becomes the server is not necessarily the same as the actual OS of the client. Thus, it is not easy to transfer the environment, in which the user executes application programs on the actual OS of the server, to the client. However, by introducing the concept of the virtual computer as in the present embodiment, it is possible to transfer the personal environment by a simple method of duplicating the personal environment information as it is. Here, however, it requires that the virtual computer program, which can construct a virtual computer based on the personal environment information, has been installed on the client too. As the virtual computer program, may be mentioned "virtual PC" of Connextix Co., Ltd. or "vmware" of VMware Co., Ltd., for example.

Further, in the present embodiment, business data on a client are encrypted using a security device such as an IC card. As a result, it is possible to keep the risk of work information leakage lower even if the client is stolen or lost.

The present embodiment will be described taking a MOPASS (Mobile Passport) card as an example of the security device. A MOPASS card is a flash memory card having an ID (personal identification) function and an encryption function, and used being inserted into a memory card slot of a client. Personal environment information sent and received between the server and a client and personal environment information held in a client are encrypted by the function of MOPASS. At the time of realizing a virtual computer using personal environment information received from the server, decoding by MOPASS can not be avoided. Thus, according to the present embodiment, when a user removes a MOPASS card from the client and carries the card with him at the time he temporarily moves away from the client, then it is impossible to decode the personal environ information to realize the virtual computer on the client.

Now, referring to the drawings, will be described in detail the present embodiment according to the invention.

FIG. 1 shows a configuration of a computer system according to the present embodiment. This computer system is provided with a blade PC system 1002, a power control unit 1003, a hub 1004, a storage unit 1005, one or more terminal PCs 1007, and a management server 1008.

The blade PC system 1002 is provided with one or more blade PCs 1001. A blade PC 1001 is provided with a blade equipped with components such as a processor, a main memory, a HDD, and the like, required for a PC. In the present embodiment, one blade PC 1001 is provided for each user, and a blade PC 1001 provides a virtual computer environment for a user who accesses that blade PC 1001 through a terminal PC 1007. The blade PC system 1002 is a collection of blade PCs 1001.

A terminal PC 1007 is a terminal used by a user for accessing the blade PC system through a network 1006. At the time of offline use, a terminal PC 1007 provides the user with a virtual computer environment similar to a blade PC 1001.

The management server 1008 controls operation of the blade PC system 1002 as a whole, controls access from a user and a terminal PC 1007 to the blade PC system 1002, and performs other operation.

Each blade PC 1001 is connected to the network 1006 through the hub 1004 and to the management server 1008 through the power control unit. The blade PC system 1002, the power control unit 1003, the management server 1008 and the storage unit 1005 realize the functions of a server 1000.

The management server 1008, the storage unit 1005 and each terminal PC 1007 functioning as a client are each connected to the network 1006.

Figure 2:
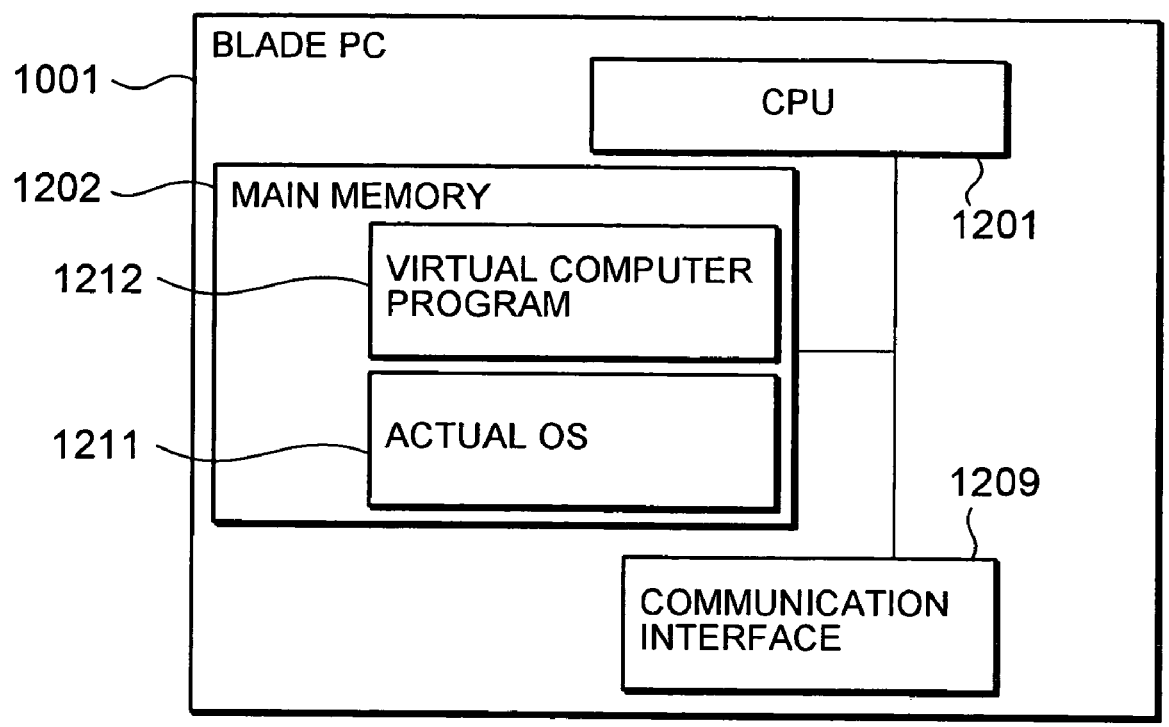
FIG. 2 is a diagram showing an internal configuration of a blade PC according to the embodiment.

FIG. 2 is a diagram showing an internal configuration of a blade PC 1001.

A blade PC 1001 comprises a CPU 1201, a main memory 1202, a communication interface 1209.

Executable files of an actual OS 1211 and a virtual computer program 1212 are read from the storage unit 1005 to the main memory 1202 and executed by the CPU 1201.

Figure 3:
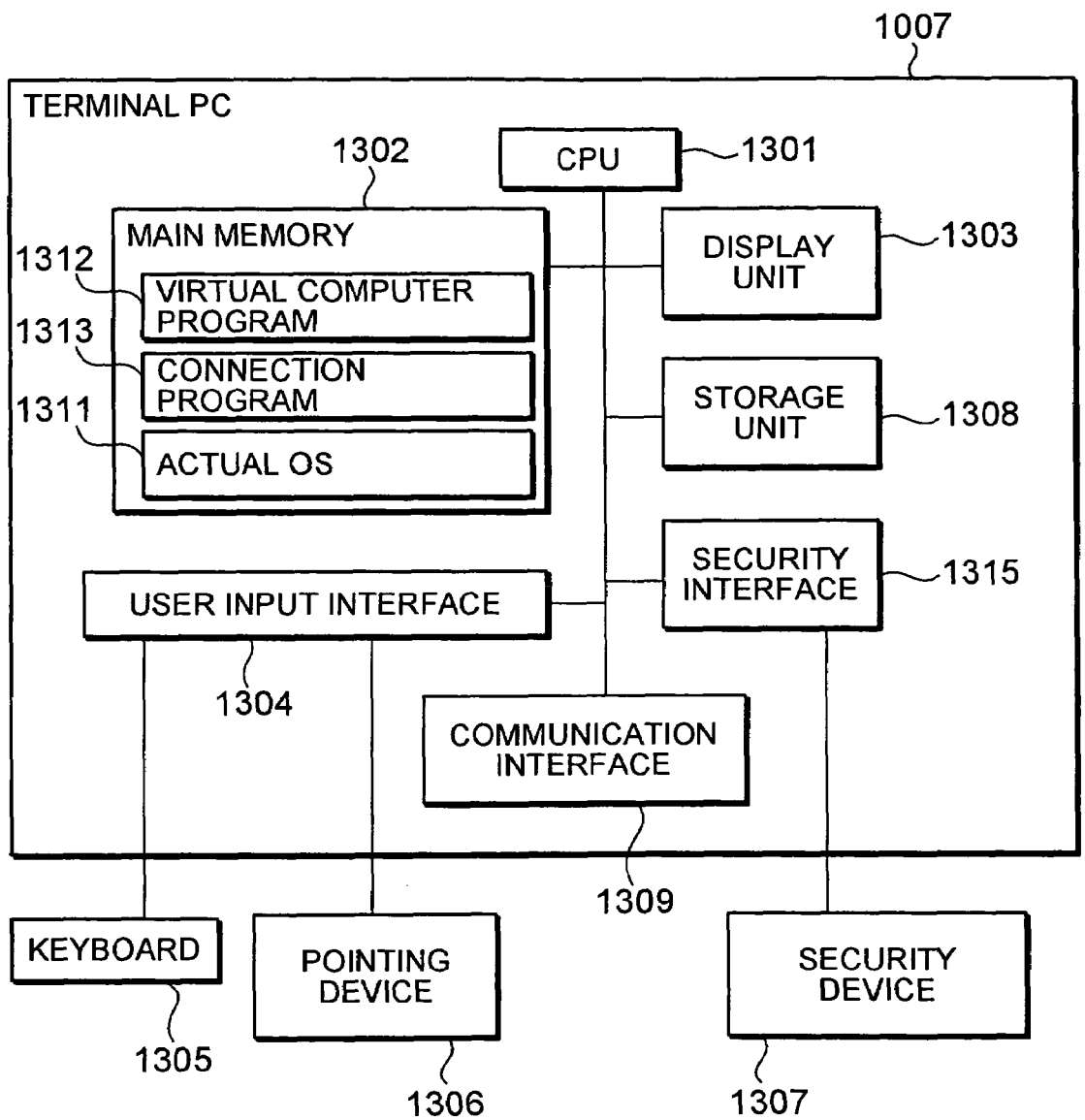
FIG. 3 is a diagram showing an internal configuration of a terminal PC according to the embodiment.

FIG. 3 is a diagram showing an internal configuration of a terminal PC 1007.

A terminal PC 1007 is provided with a CPU 1301, a main memory 1302, a display unit 1303, a user input interface 1304, a storage unit 1308, a communication interface 1309, and a security interface 1315.

The user input interface 1304 receives various instructions and input from a user through user input devices such as a keyboard 1305, a pointing device 1306 and the like connected to the user input interface 1304.

Executable files of an actual OS 1311, a virtual computer program 1312 and a connection program 1313 for connecting to the blade PC system 1002 are read to the main memory 1302 and executed by the CPU 1301. Here, the connection program 1313 is a program for the terminal PC 1007 to access the blade PC system 1002 to realize a server-based computing environment.

The security interface 1315 is an interface for mounting a security device 1307. The actual OS 1311 or the connection program 1313 uses the functions of the security device 1307 through the security interface. As described above, the present embodiment uses a MOPASS card as the security device 1307.

Figure 4A:
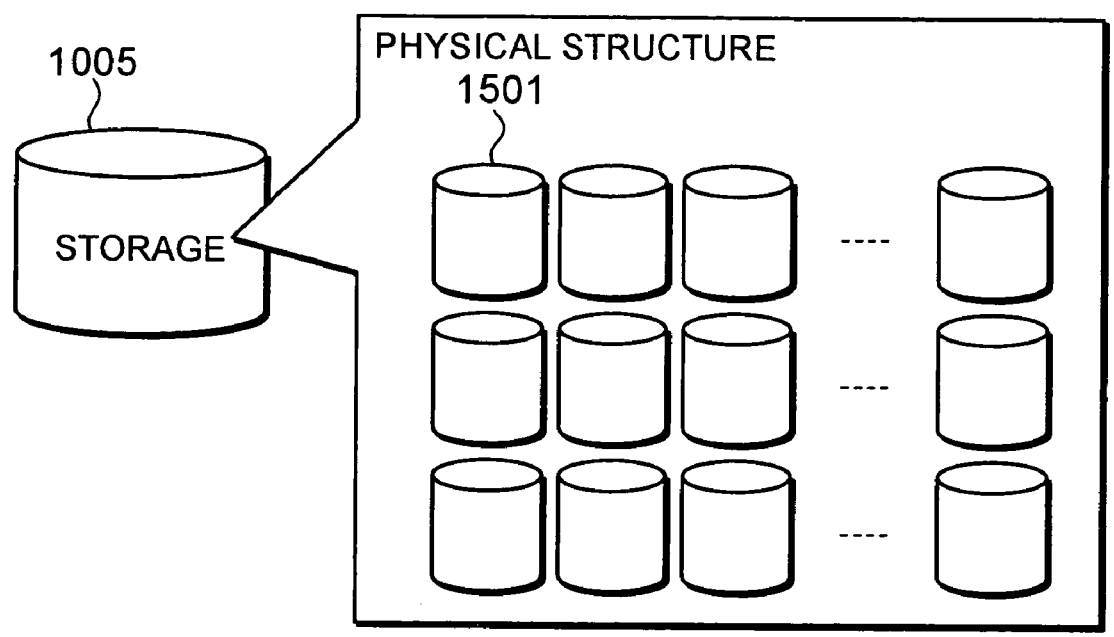
FIG. 4(A) is a diagram showing internal physical configuration of a storage unit according to the embodiment.
Figure 4B:
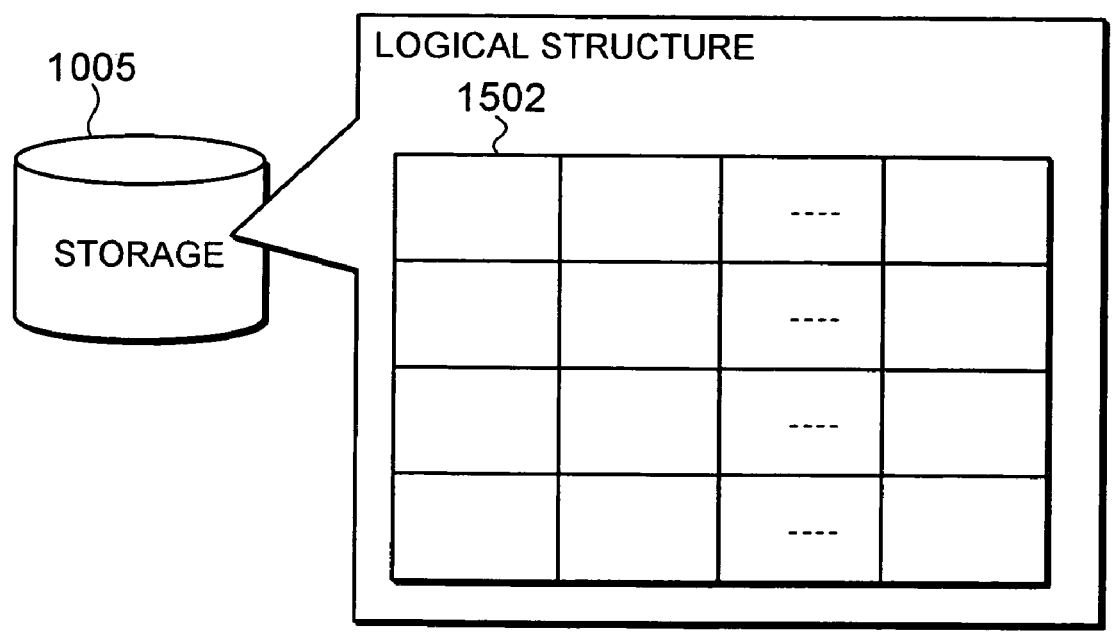
FIG. 4(B) is a diagram showing internal logical configuration of a storage unit according to the embodiment.

FIG. 4 shows an internal configuration of the storage unit 1005. FIG. 4(A) shows the internal physical configuration of the storage unit 1005, and FIG. 4(B) shows the internal logical configuration of the storage unit 1005 respectively. As shown in FIG. 4(A), the storage unit 1005 is provided with a plurality of physical disks 1501. Further, as shown in FIG. 4(B), the storage unit 1005 is managed as one or plurality of logical partition units 1502.

Figure 5:
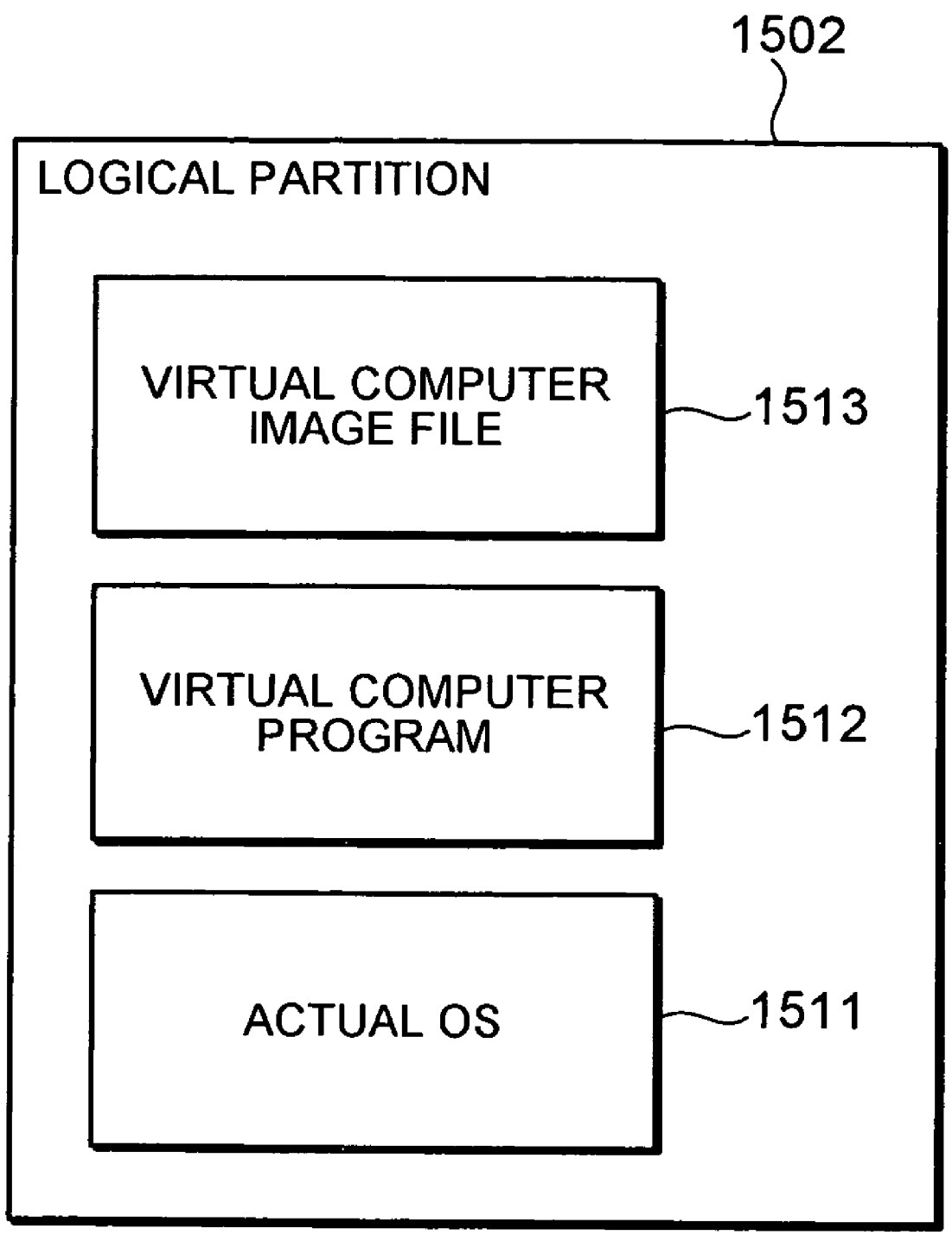
FIG. 5 is a diagram for explaining data stored in a logical partition unit according to the embodiment.

FIG. 5 is a diagram for explaining data stored in a logical partition unit 1502.

Each logical partition unit 1502 stores information corresponding to the whole storage (the storage unit 1308 in the case of a terminal PC 1007 of the present embodiment) of a PC used as a client in an ordinary server-client system. In detail, each logical partition unit 1502 stores an executable file 1511 of the actual OS 1211 operating on a blade PC 1001, an executable file 1512 of the virtual computer program 1212 operating on the executable file 1511 of the actual OS 1211, and an image file 1513 used by the executable file 1512 of the virtual computer program 1212.

A blade PC 1001 reads these executable files stored in a logical partition unit 1502 allocated to that blade PC 1001 to the main memory 1202 and executes these executable files.

Next, will be explained an image file 1513. An image file 1513 is a file that contains an image of a virtual disk of a virtual computer on which a user works.

Figure 6:
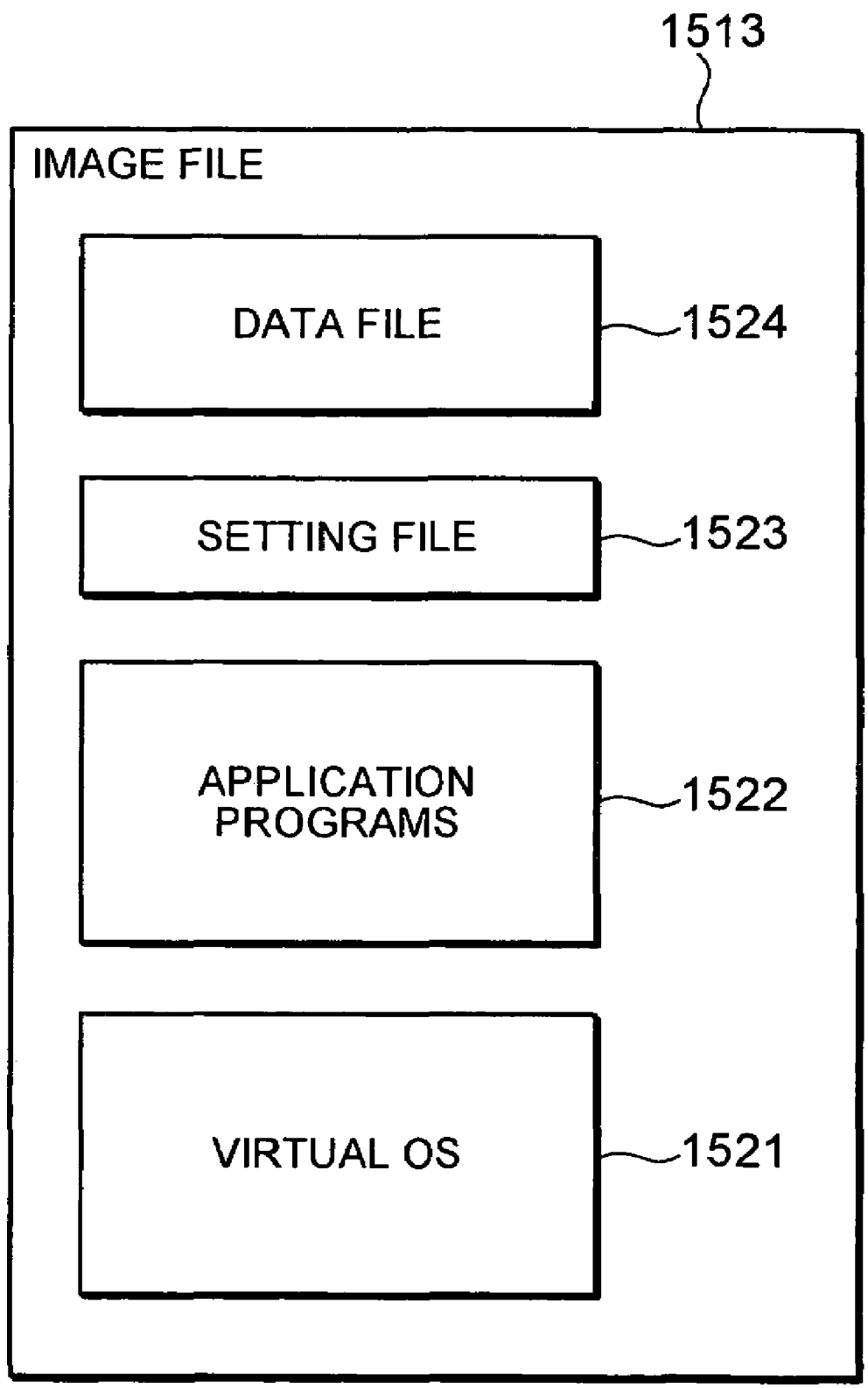
FIG. 6 is a diagram for explaining data included in an image file according to the embodiment.

FIG. 6 is a diagram for explaining data included in an image file 1513. An image file 1513 contains data groups used by the virtual computer programs 1212 and 1312 for realizing a virtual computer.

In detail, an image file 1513 includes an executable file 1521 of a virtual OS of a virtual computer, executable files 1522 of application programs operating on the virtual OS of the virtual computer, a setting file 1523 for storing various settings required for a user to work on the virtual computer, data files 1524 for storing data as objects of editing and the like using the application programs and the like on the virtual computer.

Next, will be described a virtual computer 1220 that is realized by the virtual computer program 1212 and 1312 using an image file 1513.

Figure 7:
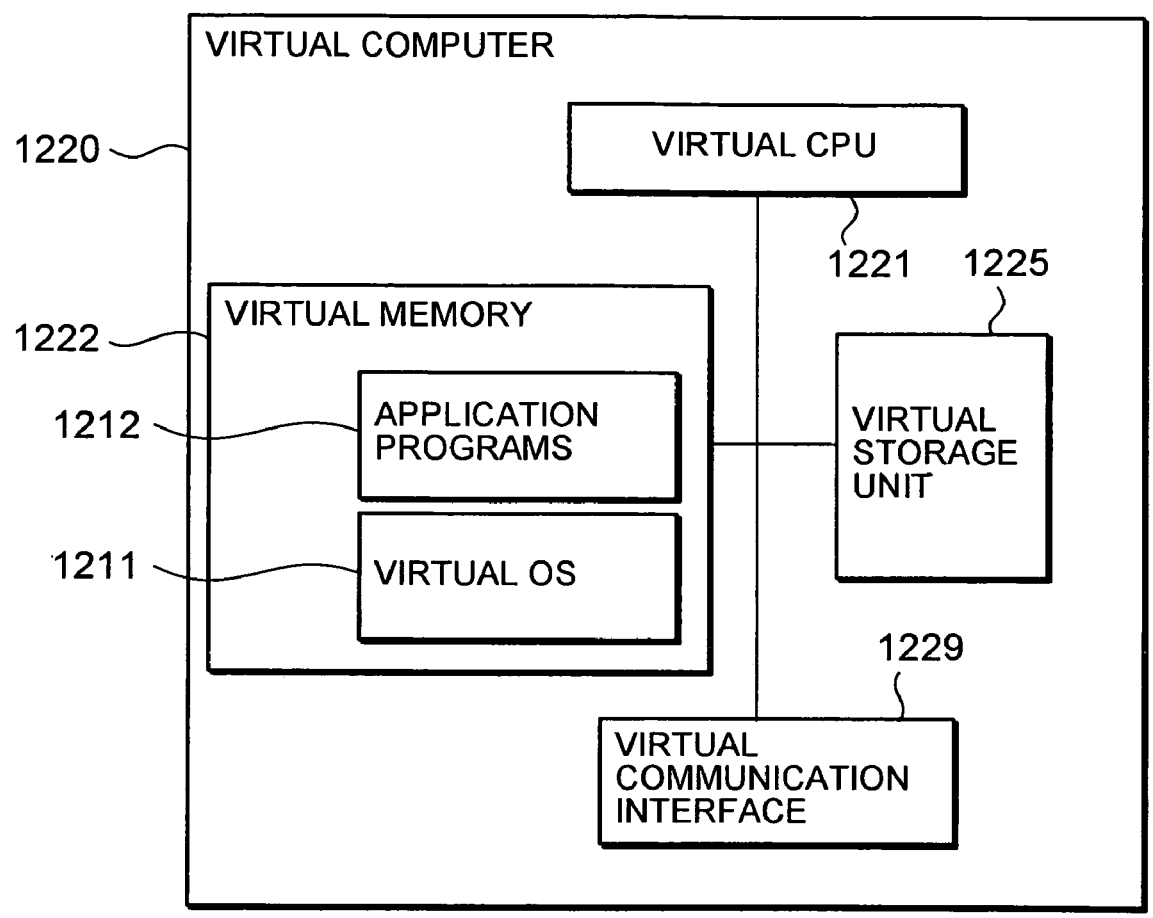
FIG. 7 is a diagram showing a configuration of a virtual computer according to the embodiment.

FIG. 7 is a diagram showing a configuration of a virtual computer 1220 according to the present embodiment.

A virtual computer 1220 is provided with a virtual CPU 1221, a virtual memory 1222, a virtual storage unit 1225, and a virtual communication interface 1229. These components are virtual hardware realized when the virtual computer program 1212 or 1312 executes an image file 1513.

On a virtual computer 1220, a virtual OS 1231 and application programs 1232 are read from the virtual storage unit 1225 to the virtual memory 1222 and executed by the virtual CPU 1221 to realize the functions of the virtual OS and to perform processing of each application.

Next, referring to FIGS. 8, 9 and 10, will be described a flow of processing in the present embodiment at the time of transition between a state where a terminal PC 1007 is connected to the network 1006 and a state where the terminal PC 1007 is not connected to the network 1006.

An outline of the flow is as follows. A user accesses the blade PC system 1002 from a terminal PC 1007 through the network 1006, activates the virtual computer 1220 on the blade PC 1001 allocated to the user, and executes application programs in that environment.

When the user disconnects the terminal PC 1007 from the network, the environment of the virtual computer 1220 at the end of the working is transferred as an image file 1513 to the terminal PC 1007. The transferred image file 1513 reflects data files and configuration setting used by the user as well as changes of the settings of the application programs and the virtual OS. Based on the transferred image file 1513, the terminal PC 1007 disconnected from the network 1006 realizes an environment similar to the virtual computer 1220 on the blade PC to execute the application programs.

Further, when the user connects the terminal PC 1007 to the blade PC system 1002 through the network 1006 again, then the environment, which has been realized by the virtual computer 1220 on the terminal PC 1007 at the time of the connection, is sent as an image file 1513 to the blade PC 1001. Then, the environment at the time of using the terminal PC 100 is realized on the blade PC 1001.

FIG. 8 is a flowchart showing a flow from first connection of a terminal PC 1007 to the network 1006 down to a start of processing such as execution of application programs on the blade PC system 1002.

In that case, since it is the first connection, the terminal PC 1007 does not hold an image file 1513 in the storage unit 1308.

First, when the terminal PC 1007 detects turning on of the power, the CPU 1301 activates the actual OS 1311 (Step 2001). Next, the CPU 1301 judges whether the security device 1307 is connected to the terminal PC 1007 (Step 2002). The present embodiment is described taking the example where a MOPASS card, which is a flash memory card having an ID (personal identification) function and an encryption function, is used as the security device, as described above.

When the CPU 1301 detects that the terminal PC 1007 is connected to the network 1006 (Step 2003), then the CPU 1301 executes the connection program 1313 for connecting to the blade PC system 1002 to access the management server 1008 from the terminal PC 1007 through the communication interface 1309 and the network 1006 (Step 2004). Here, it does not matter which of the detection of insertion of a MOPASS card and the detection of connection to the network is performed first.

Using authentication information, a password and the like, the management server 1008 performs user authentication to determine whether connection to the blade PC system 1002 should be permitted or not (Step 2005). Here, the authentication information is obtained from the security device 1307 and sent from the connection program 1313, and the password is inputted by the user. When the authentication is successful, the management server 1008 determines a blade PC 1001 to be connected to the terminal PC 1007. If the blade PC 1001 in question is in a stopped state, the management server 1008 turns on the power to the blade PC 1001 through the power control unit 1003 and activates the actual OS 1211 (Step 2006). The management server 1008 manages user's authentication information in association with a certain blade PC 1001 beforehand. As a result, in Step 2006, it is possible to determine the same blade PC 1001 for a connection request from the same user. Further, after determination of the blade PC 1001, the management server 1008 may associate the user's authentication information also with the terminal PC 1007 used by the user at that point, and hold the information on that association.

The terminal PC 1007, for which the management server 1008 has permitted the connection, establishes a connection through the network 1006 to the blade PC 1001 determined by the management server 1008, using the connection program 1313 (Step 2007).

At that time, the CPU 1301 of the terminal PC 1007 judges whether a duplicate of an image file 1513 is held in its storage unit 1308. When a duplicate is held, the time stamp (latest update time) information of the image file 1513 is sent to the blade PC 1001.

On the other hand, receiving the time stamp information, the blade PC 1001 compares the received time stamp information with the time stamp (latest update time) information of the image file 1513 held by the blade PC 1001 itself, to determine which time stamp information is new. Then, the blade PC 1001 notifies the result to the terminal PC 1007.

The terminal PC 1007 sends the image file 1513 held by itself to the blade PC 1001, only when the terminal PC 1007 receives notification that the time shown by the time stamp information of the image file 1513 held by the terminal PC 1007 itself is newer.

Receiving the image file 1513, the blade PC 1001 overwrites the image file that it holds, with the received image file 1513.

The present procedure is the procedure for the first connection, as described above. Thus, the storage unit 1308 does not hold a duplicate of an image file 1513. And, the CPU 1301 of the terminal PC 1007 does not perform the processing of sending time stamp information and the processing thereafter.

Further, in the above-described procedure, the CPU 1301 of the terminal PC 1007 judges whether a duplicate of an image file 1513 is held in its storage unit 1308, and then sends the time stamp information only. However, this arrangement is not restrictive. For example, it is possible to employ an arrangement that, when a duplicate of an image file 1513 is held in the storage unit 1308, the image file 1513 itself is sent. In that case, the blade PC 1001 compares the time stamp information of the image file received from the terminal PC 1007 with the time stamp information of the image file that the blade PC 1001 itself holds. And, only when the time stamp of the received image file is newer, the blade PC 1001 overwrites the image file 1513 that it holds with the received image file 1513.

Next, when the actual OS 1211 is activated in Step 2006, the CPU 1201 of the blade PC 1001 executes the virtual computer program 1212 on the actual OS 1211. As a result, the virtual computer 1220 and the virtual OS 1231 on the virtual computer 1220 are activated (Step 2008).

Thereafter, according to the ordinary server-based computing technique, the terminal PC 1007 activates the application programs 1232 on the virtual OS 1231, to perform processing (Step 2009). Through the terminal PC 1007, the user does his desired work on the virtual computer 1220 of the blade PC 1001 to which the terminal PC 1007 is connected. Namely, using the devices such as the keyboard 1305, the pointing device 1006 and the like, the user of the terminal PC 1007 can operate the virtual OS 1231 on the blade PC 1001 and confirm the execution state through the display unit 1303.

FIG. 9 shows a flow of disconnecting the terminal PC 1007 from the network 1006, wherein the terminal PC 1007 has been connected to the blade PC system 1002 through the network 1006 according to the processing shown in FIG. 8.

First, the user using the application programs 1232 on the virtual computer 1220 saves the work contents and terminates the application programs 1232 and the virtual OS 1231 on the virtual computer 1220.

Namely, when an instruction to terminate all the running application programs is received from the user, the terminal PC 1007 sends the instruction to the blade PC 1001. In the blade PC 1001, the CPU 1221 of the virtual computer 1220 saves the work contents under processing, and terminates the application programs 1232 (Step 2011). Here, as for the work contents under processing, the data as objects of editing by the application programs 1232 are stored in the data files 1524. Further, setting information of the application programs is stored in the setting file 1523.

Next, the CPU 1201 terminates the virtual OS 1231 and the virtual computer program 1212 (Step 2012). At that time, setting information of the virtual OS 1231 is saved in the setting file 1523. Thus, even when the settings of the application programs 1232 and the virtual OS 1231 were changed by user's operation in the course of using the virtual computer 1220, the setting file 1523 saves the setting information after the changes.

Then, the saved data 1524 and the setting file 1523 together with the executable files of the application programs and the virtual OS 1521 are put into the form of an image file, and retained as an image file 1513. The latest state of the virtual computer 1220 at the time when the instruction to terminate the application programs was received from the user is saved as the image file 1513. At this point, only the actual OS 1211 operates on the blade PC 1001.

Next, in the case where the user has previously given an instruction to the connection program 1313 to the effect that the work is expected to be done successively on the PC 1007 in a stand-alone state, then the connection program 1313 transfers the image file 1513 from the blade PC 1001 to the terminal PC 1007 through the network 1006 (Step 2013). The terminal PC 1007 stores the received image file 1513 to the storage unit 1308.

Next, the CPU 1201 of the blade PC 1001 terminates the actual OS 1211 running on the blade PC 1001, and the CPU 1301 of the terminal PC 1007 breaks the connection with the blade PC 1001 and terminates the connection program 1313. Lastly, the terminal PC 1007 is separated from the network (Step 2014).

As described above, in the present embodiment, a MOPASS card is used as the security device 1307. An image file 1513 is encrypted according to the functions of the security device (MOPASS card) 1307 and the actual OS 1311 and stored to the storage unit 1308. At the time of execution, the image file 1513 is decoded by the security device 1307 and the actual OS 1311 and read into the main memory 1302.

Thus, according to the present embodiment, the image file 1513 sent to the terminal PC 1007 can not be decoded and executed without the security device 1307. Accordingly, when the user removes the security device 1307 from the terminal PC and carries the security device 1307 with him at the time the user temporarily moves away from the terminal PC 1007, the contents of the image file 1513 including the information on the work can be protected against illegal access of a third party even if the terminal PC 1007 were lost or stolen.

Hereinabove, the description has been given taking the example where the connection program 1313 previously registers whether the terminal PC 1007 will be successively used as a stand-alone computer. However, this is not restrictive. It may be arranged that an instruction is received before proceeding to the processing in Step 2013. Or, it may be arranged that the image file is transferred to the terminal PC 1007 always when the terminal PC 1007 is disconnected, without receiving an instruction relating to successive use of the terminal PC 1007 from the user.

Further, in the above embodiment, it is arranged that the terminal PC 1007 holds the received image file 1513 in the storage unit 1308. However, this is not restrictive. For example, the received image file 1513 may be stored in the MOPASS card itself.

FIG. 10 is a flowchart showing a flow after the reception of the image file 1513 according to the flow of FIG. 9 and stand-alone use of the terminal PC 1007 down to connection of the terminal PC 1007 to the network again.

First, when the CPU 1301 executes the virtual computer program 1312 on the actual OS 1311 running on the terminal PC 1007, then the virtual computer 220 is activated using the information of the image file 1513 that has been transferred to the storage unit 1308 of the terminal PC 1007 (Step 2021). Namely, the virtual OS 1521 is activated according to the setting held in the setting file 1523 to realize the environment based on the virtual computer 1220 in the terminal PC 1007. Receiving instructions from the user, the application programs 1522 stored in the image file 1513 are executed according to the various settings held in the setting file 1523 (Steps 2022 and 2023).

The user can use the virtual computer 1220 on the offline terminal PC 1007 similarly to the case where the terminal PC 1007 is connected to the blade PC 1001 using the connection program 1313. In other words, even in the state where the terminal PC 1007 is not connected to the network 1006, the user can do his work using the application programs 1232 in the same computer environment as the computer environment at the time of being connected to the network.

When an instruction to terminate the application programs is received from the user, the CPU 1301 saves the data file 1524 into the image file 1513, and terminates the application program 1232 (Step 2024). At that time, if the settings of the application programs have been changed by operations of the user, the setting file 1523 reflecting the changed settings is saved into the image file 1513.

Next, the CPU 1301 terminates the virtual OS 1231 and the virtual computer program 1312 (Step 2025), and saves the latest state of the virtual computer 1220 into the image file 1513. At that time, if the setting of the virtual OS 1231 has been changed, the setting file 1523 reflecting the changed setting information is saved into the image file 1513.

Next, after confirming that the security device is connected, the CPU 1301 connects the terminal PC 1007 to the network 1006 (Step 2026). Then, similarly to Steps 2004-2007 in FIG. 8, the terminal PC 1007 is connected to a blade PC 1001. This blade PC 1001 is also determined by the management server 1008, and thus, is the blade PC 1001 managed in association with the user's authentication information sent from the terminal PC 1007.

At this time, the storage unit 1308 of the terminal PC 1007 stores the image file 1513, as described above. Thus, the CPU 1301 sends the time stamp information and receives a return from the blade PC 1001 to the effect that the image file 1513 held in the terminal PC 1007 is newer.

Then, using the connection program 1313, the CPU 1301 transfers the image file 1513 from the terminal PC 1007 to the blade PC 1001 through the network 1006 (Step 2027).

The blade PC 1001 over writes the existing image file 1513 with the received image file 1513. The existing image file 1513 is stored in the logical partition unit of the storage unit 1005 managed by the blade PC 1001 itself. Then, the work is processed using the blade PC 1001 similarly to Step 2009 and the following Steps of FIG. 8, depending on the situation.

Thus, it is possible to transfer the latest environment, in which the work has been processed on the terminal PC 1007, to the blade PC 1001. Thus, as the server-based computing environment on the blade PC 1001 provided for the terminal PC 1007, it is possible to provide the server-based computing environment similar to the environment of the offline use of the terminal PC 1007.

As described above, according to the present embodiment, application programs are not activated on the respective actual OSs of the blade PC 1001 and the terminal PC 1007. But, the virtual computer is realized on the respective actual OSs of the blade PC 1001 and the terminal PC 1007, and the application programs are executed on the virtual computer. The data required for realizing the virtual computer and for executing the application programs on the virtual computer are stored inone image file. This image file is transferred between the blade PC 1001 and the terminal PC 1007. As a result, on either PC, the application programs are executed on the same virtual OS, and the setting of the environment is inherited. Thus, the user does not need to be conscious of difference between the actual OSs of the blade PC 1001 and the terminal PC 1007 nor version difference of an application.

Further, according to the present embodiment, the authentication processing and the encryption processing using MOPASS are introduced, to prevent access of a non-authorized person to the image file that is sent and received between the server and a client and required for realizing the virtual computer environment.

According to the present embodiment, it is possible to provide an environment that allows working on an offline client while ensuring operability and security similar to working in a server-based computing environment on an online client connected to a server.

As described above, in a server-based environment, the present invention can safely provide an environment on a server to a user on a terminal even at a place where network connection can not be established.

The invention claimed is:

1. A computer system comprising one or more terminals each permitting offline work and a computer to which said terminals are connected through a network, for executing application programs (hereinafter, referred to as APs) requested by said terminals, wherein:
said computer comprises, for each terminal connected to said computer:
a storage area for storing executable files of the APs, wherein said files are executed on said computer upon receiving a request for APs from said terminal, data as objects of editing by said APs, an executable OS file for realizing an OS of a virtual computer, and setting information required for working on said virtual computer;
a virtual computer control means, which realizes the virtual computer, using said executable OS file; and
a control means, which executes an AP requested by said terminal out of said APs using said setting information on said virtual computer, and, on receiving an instruction to terminate said AP from said terminal, stores a combination of said setting information, said executable OS file, said data and said executable files of the APs as an image file at a time of receiving said instruction into said storage area, and transfers said image file to said terminal before said terminal breaks the connection; and
each of said terminals comprises:
a storage unit that stores said image file received from said computer, before said terminal breaks the connection;
a terminal virtual computer control means, which realizes the virtual compute after said terminal breaks the connection, using said executable OS file of said image file on said terminal; and
a terminal control means, which uses said setting information of said image file to execute said APs on said virtual computer when the terminal is not connected to said computer after said terminal breaks the connection.

2. A computer system according to claim 1, wherein:
said control means transfers said image file to said terminal only when an instruction is received from a user through a terminal to an effect that offline processing is to be performed.

3. A computer system according to claim 1, wherein:
when a terminal is connected to said computer at a time after said terminal breaks the connection, said terminal control means sends said image file stored in said storage unit to said computer, and deletes said image file in said storage unit after sending said image file; and
when said image file is received from said terminal, said control means overwrites the existing image file stored in said storage area with the received image file.

4. A computer system according to claim 1, wherein:
said computer system further comprises a removable security device;
each of said terminals further comprises a security interface as an interface with said security device; and
when said image file is received from said computer, said terminal control means encrypts the image file in said storage unit using said security device, and, when said APs are to be executed after said terminal breaks the connection, said terminal control means decodes said image file to execute said APs using said security device.

5. A computer with which one or more terminals are connected through a network, wherein:
said computer comprises, for each of said terminals:
a storage area for storing executable files of application programs (hereinafter, referred to as APs), data as objects of editing by said APs, an executable OS file for realizing an OS running on a virtual computer, and setting information required for working on said virtual computer, wherein said files are executed on said computer upon receiving a request for application programs from said terminal;
a virtual computer control means, which realizes the virtual computer, using said executable OS file; and
a control means; and
said control means executes an AP requested by the terminal out of said APs using said setting information on said virtual computer, and, on receiving an instruction to terminate said AP from said terminal, stores a combination of said setting information, said executable OS file, said data and said executable files of the APs as an image file at a time of receiving said instruction into said storage area, and transfers said image file to said terminal before said terminal breaks the connection.

6. A computer according to claim 5, wherein:
when said image file is received from a terminal reconnecting to said computer after said terminal breaks the connection, said control means overwrites the existing image file stored in said storage area with the received image file.

7. A terminal that permits offline work and that is connected to a computer through a network to have application programs (hereinafter, referred to as APs) executed on said computer upon receiving a request for application programs from said terminal, wherein:
said terminal comprises:
a storage unit that stores an image file received from said computer;
a terminal virtual computer control means, which realizes a virtual computer; and
a terminal control means, which executes said APs on said virtual computer when the terminal is not connected to said computer on said terminal; and
said image file includes: executable files of said APs, data as objects of editing by said APs, an executable OS file for realizing an OS of the virtual computer, and setting information required for working on said virtual computer, at a time of terminating an AP executed on said computer;
said terminal virtual computer control means realizes said virtual computer on said terminal using said executable OS file in said image file; and said terminal control means uses said setting information to executes said APs.

8. A terminal according to claim 7, wherein:
when the terminal is connected to said computer, said terminal control means sends said image file stored in said storage unit to said computer, and deletes said image file in said storage unit after sending said image file.

9. A terminal according to claim 7, wherein:
said terminal further comprises a security interface as an interface with a removable security device; and
when said image file is received from said computer, said terminal control means encrypts the image file in said storage unit using said security device, and, when said APs are to be executed, said terminal control means uses said security device to decode said image file to execute said APs.

10. A method of making an execution environment on a computer coincide with an execution environment on a terminal when application programs (hereinafter, referred to as APs) requested by said terminal are executed on said computer and execution results are provided to said terminal or when said application programs are executed on said terminal, for each terminal that belongs to a computer system comprising one or more terminals each permitting offline work and the computer to which said terminals are connected through a network, wherein:
each of said computer and said terminals comprises a virtual computer realizing means, which realizes a virtual computer on an OS of its own;
when said computer or said terminal receives an instruction to execute said APs, said computer or said terminal executes said APs on said virtual computer, and when said computer or said terminal receives an instruction to terminate said APs before said terminal breaks the connection, said computer or said terminal holds, as an image file, a combination of setting information for working on the virtual computer, executable files of said APs, data as objects of said APs, and an executable OS file for realizing an OS of said virtual computer, at a time of receiving said instruction to terminate the APs after said terminal breaks the connection;
when a terminal is disconnected from said computer, said image file is sent from said computer to said terminal;
when a terminal is connected to said computer, said image file is sent from said terminal to said computer; and
said terminal or said computer receiving said image file overwrites the existing image file with the received image file.

11. A computer system comprising one or more terminals each permitting offline work and a computer to which said terminals are connected through a network, executing application programs (hereinafter, referred to as APs) requested by said terminals on said computer, wherein:
said computer comprises, for each user, a storage area that stores information on a personal environment for executing APs requested by a user through a terminal;
each of said terminals comprises a storage unit that holds information on a personal environment for executing APs requested by a user of said terminal; and
said system synchronizes the information on the personal environment stored in said storage area for a user of a terminal with the information on the personal environment stored in said storage unit of said terminal, when said terminal is disconnected from said network and when said terminal is connected to said network again.

12. A computer system according to claim 11, wherein:
each of said terminals further comprises a security device; and
said information on the personal environment is encrypted by said security device and stored in said storage unit.

13. A computer system according to claim 2, wherein:
when a terminal is connected to said computer at a time after said terminal breaks the connection, said terminal control means sends said image file stored in said storage unit to said computer, and deletes said image file in said storage unit after sending said image file; and
when said image file is received from said terminal, said control means overwrites the existing image file stored in said storage area with the received image file.

14. A computer system according to claim 2, wherein:
said computer system further comprises a removable security device;
each of said terminals further comprises a security interface as an interface with said security device; and
when said image file is received from said computer, said terminal control means encrypts the image file in said storage unit using said security device, and, when said APs are to be executed after said terminal breaks the connection, said terminal control means decodes said image file to execute said APs using said security device.

15. A computer system according to claim 3, wherein:
said computer system further comprises a removable security device;
each of said terminals further comprises a security interface as an interface with said security device; and
when said image file is received from said computer, said terminal control means encrypts the image file in said storage unit using said security device, and, when said APs are to be executed, said terminal control means decodes said image file to execute said APs using said security device.

16. A terminal according to claim 7, wherein: said terminal further comprises a security interface as an interface with a removable security device; and
when said image file is received from said computer, said terminal control means encrypts the image file in said storage unit using said security device, and, when said APs are to be executed, said terminal control means uses said security device to decode said image file to execute said APs.

17. A computer system according to claim 11, wherein said computer further comprises:
a control means, which executes an AP requested by said terminal out of said APs using said setting information on said virtual computer, and, on receiving an instruction to terminate said AP from said terminal, stores a combination of said setting information, said executable OS file, said data and said executable files of the APs as an image file at a time of receiving said instruction into said storage area, and transfers said image file to said terminal before said terminal breaks the connection.

18. A computer system according to claim 11, wherein said storage area that stores information on a personal environment for executing APs requested by a user through a terminal, further stores: data as objects of editing by said APs, an executable OS file for realizing an OS of a virtual computer, and setting information required for working on said virtual computer.

* * * * *